United States Patent [19]

Sahrbacker

[11] 4,314,170
[45] Feb. 2, 1982

[54] HAND POWER TOOL CONTROL UNIT

[75] Inventor: Edward V. Sahrbacker, Brecksville, Ohio

[73] Assignee: Lucerne Products, Inc., Northfield, Ohio

[21] Appl. No.: 16,781

[22] Filed: Mar. 2, 1979

[51] Int. Cl.³ .......................................... H02K 11/00
[52] U.S. Cl. ................................. 310/68 R; 310/50; 310/62; 310/71; 310/72
[58] Field of Search .................. 310/72, 58, 68 R, 62, 310/68 A, 63, 42, 50, 47, 71; 339/112 R; 200/157; 318/345 R, 345 D

[56] References Cited

U.S. PATENT DOCUMENTS

| | | | |
|---|---|---|---|
| 3,260,873 | 7/1966 | Wilson | 310/72 |
| 3,336,490 | 8/1967 | Yelpo | 310/71 |
| 3,378,708 | 4/1968 | Baker | 310/68 R |
| 3,456,230 | 7/1969 | Mattews | 310/68 R |
| 3,458,793 | 7/1969 | Tsergas | 310/68 R |
| 3,484,632 | 12/1969 | Opalenik | 310/68 R |
| 3,536,973 | 10/1970 | Matthews | 338/200 |
| 3,588,411 | 6/1971 | Milcoy | 310/68 R |
| 3,604,960 | 9/1971 | Krestel | 310/50 |
| 3,648,142 | 3/1972 | Corey | 200/157 |
| 4,179,644 | 12/1979 | Vassos | 310/50 |

FOREIGN PATENT DOCUMENTS

| | | |
|---|---|---|
| 1993090 | 9/1968 | Fed. Rep. of Germany . |
| 2209733 | 10/1978 | Fed. Rep. of Germany . |
| 997131 | 7/1965 | United Kingdom ............ 310/50 |
| 1118242 | 6/1968 | United Kingdom . |
| 1289359 | 9/1972 | United Kingdom ............ 310/50 |

Primary Examiner—R. Skudy
Attorney, Agent, or Firm—Baldwin, Egan, Walling & Fetzer

[57] ABSTRACT

A portable electric motor-driven tool including an electric motor and an electrical control system for controlling the speed of the motor. The control system includes an electric switch for controlling the flow of electrical current to the motor and a composite thyristor and heat sink assembly, with electrical current conducting wires connecting the switch with the assembly. The motor has a fan providing an air stream for cooling the motor. The motor housing has a cavity disposed in the airstream and is configured to receive the thyristor and heat sink assembly and its electrical current conducting wires in quickly detachable relation therein. The heat sink includes an elongated base having laterally extending heat dispersing vanes of various sizes with each vane having a wing portion extending laterally from the vane for added heat dispersement.

1 Claim, 7 Drawing Figures

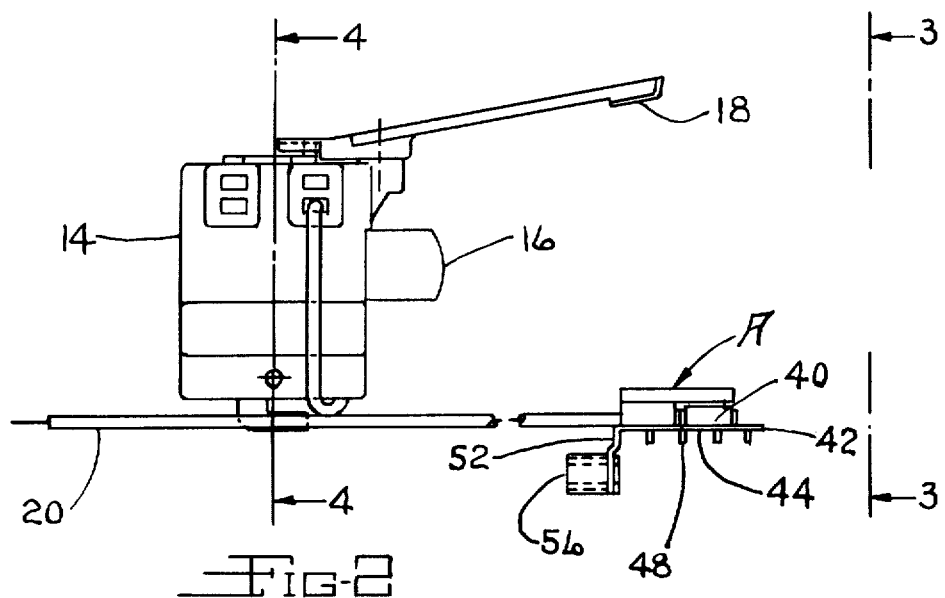
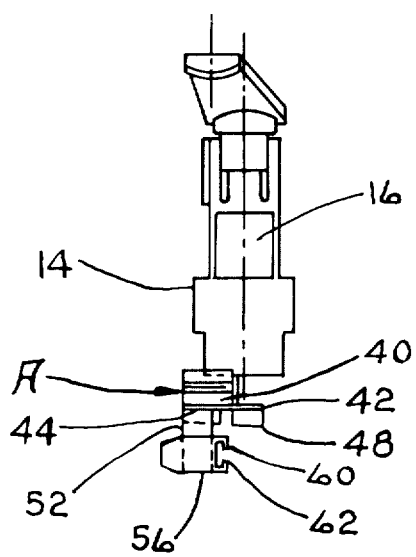
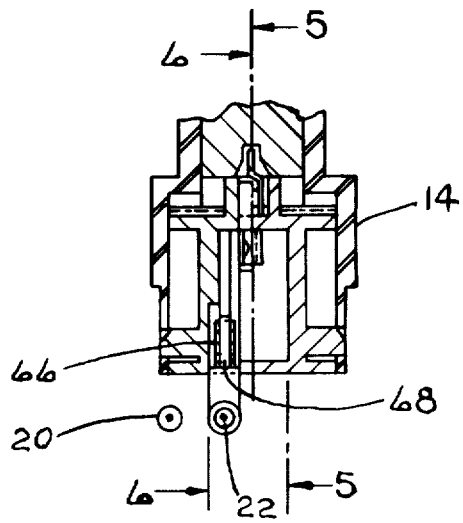

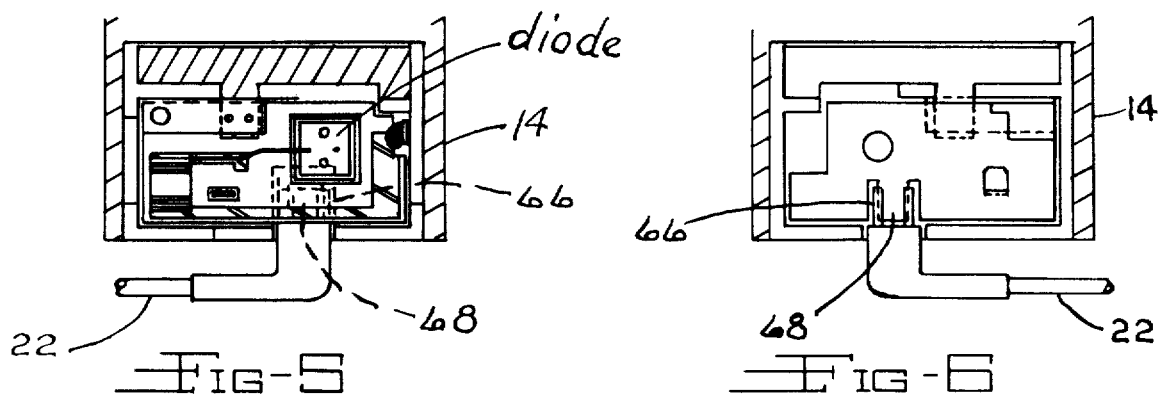
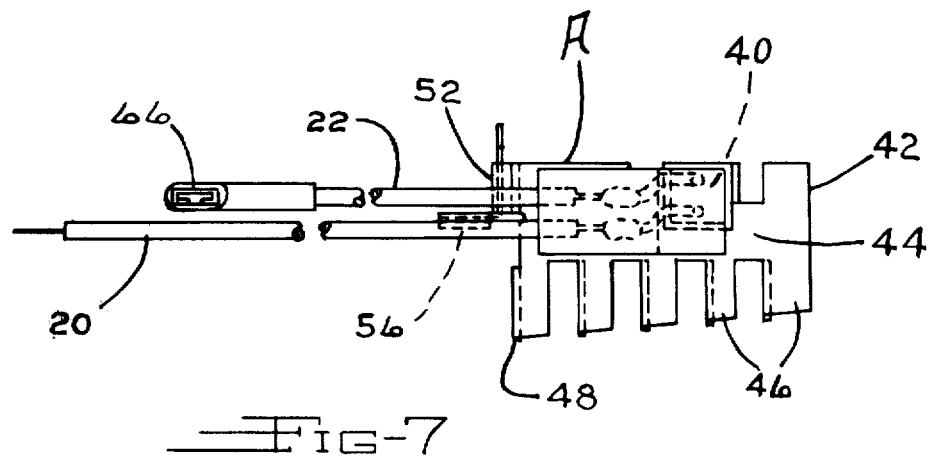

4,314,170

HAND POWER TOOL CONTROL UNIT

This invention relates to electrical control units for hand power tools and more particularly to such electrical control units having a thyristor and heat sink assembly therein.

BACKGROUND OF THE INVENTION

Trigger controlled power operated tools, appliances, or the like are well known in the art, some of which include electrical control circuits for controlling the speed of the motor of the tool by movement of the trigger mechanism. Many of these tools, particularly electrical drills, employ a thyristor such as, for example, a silicon controlled rectifier unit (commonly called an SCR), or a triac, in their electrical control systems. In operation, such thyristors generate heat when under normal operation, such heat often causing premature failure of the units. Oftentimes the thyristors are the first part of the control system to fail, thus rendering the tool totally inoperative.

In some electrical hand tools the thyristor overheating problem has been partially alleviated by placing the thyristor directly in the exiting airstream generated by the fan which cools the motor. Although such cooling of the thyristor has reduced or prolonged their failure, the fact remains that even in tools having a fan-cooled thyristor, the thyristor is still the first part to fail. Even though a thyristor is relatively inexpensive in comparison with other parts of the tool, their replacement is most difficult if not impossible because of its inaccessability in the tool and difficulty of replacement in the control circuit even if accessability thereto is accomplished.

The SCR or triac (or like thyristor) overheating problem has also been partially alleviated by employing a control circuit bypass switch which cuts out the SCR or triac from the control circuit when the motor reaches substantially full speed, as shown and described in U.S. Pat. No. 3,536,973, issued Oct. 27, 1970, to applicant's assignee.

SUMMARY OF THE INVENTION

An object of the invention is to provide an electrical hand tool employing a thyristor-heat sink assembly in its electrical control circuit that is simple in construction, inexpensive to manufacture, and highly effective in operation.

A further object of the invention is to provide a hand tool of the above type wherein the thyristor-heat sink assembly is easily replaceable.

A further object of the invention is to provide a hand tool of the above type wherein the heat sink is configured for optimum heat dispersement from the thyristor.

A further object of the invention is to provide a hand tool of the above type having a triac-heat sink assembly therein that is constantly air-cooled, whereby the current carrying capacity of the triac is increased to the point where such triac may be kept in the control circuit even when the motor is operating at full speed, thereby eliminating the need of a bypass switch.

Briefly, the foregoing objects are accomplished by the provision of a portable electric motor-driven tool including an electric motor and an electrical control system for controlling the speed of the motor. The control system includes an electric switch for controlling the flow of electrical current to the motor and a composite thyristor-heat sink assembly, with electrical current conducting wires connecting the switch with the assembly. The motor has a fan providing an airstream for cooling the motor. The motor housing has a cavity disposed in the airstream and is configured to receive the thyristor-heat sink assembly and its electrical current conducting wires in quickly detachable relation therein. The heat sink includes an elongated base having laterally extending heat dispersing vanes of various sizes with each vane having a wing portion extending laterally from the vane for added heat dispersement. With this construction, the heat sink provides very quick dispersement of heat from the thyristor and, should the thyristor replacement be required, such replacement is very easily effected by simply snapping out the old thyristor-heat sink assembly and snapping in a new one.

Other objects and advantages of the invention will be apparent from the following description taken in conjunction with the drawings wherein:

BRIEF DESCRIPTION OF THE DRAWINGS

FIG. 2 is a front elevational view of the drill trigger switch and the attached thyristor and heat sink assembly of the type used in the drill of FIG. 1;

FIG. 3 is a side elevational view of the assembly shown in FIG. 2;

FIG. 4 is a portional sectional view taken along the line 4—4 of FIG. 2;

FIG. 5 is a view taken along the line 5—5 of FIG. 4;

FIG. 6 is a view taken along the line 6—6 of FIG. 4; and

FIG. 7 is a side elevational view of the thyristor and heat sink assembly, with portions thereof being shown in phantom view.

DESCRIPTION OF THE PREFERRED EMBODIMENT

Figure 1:
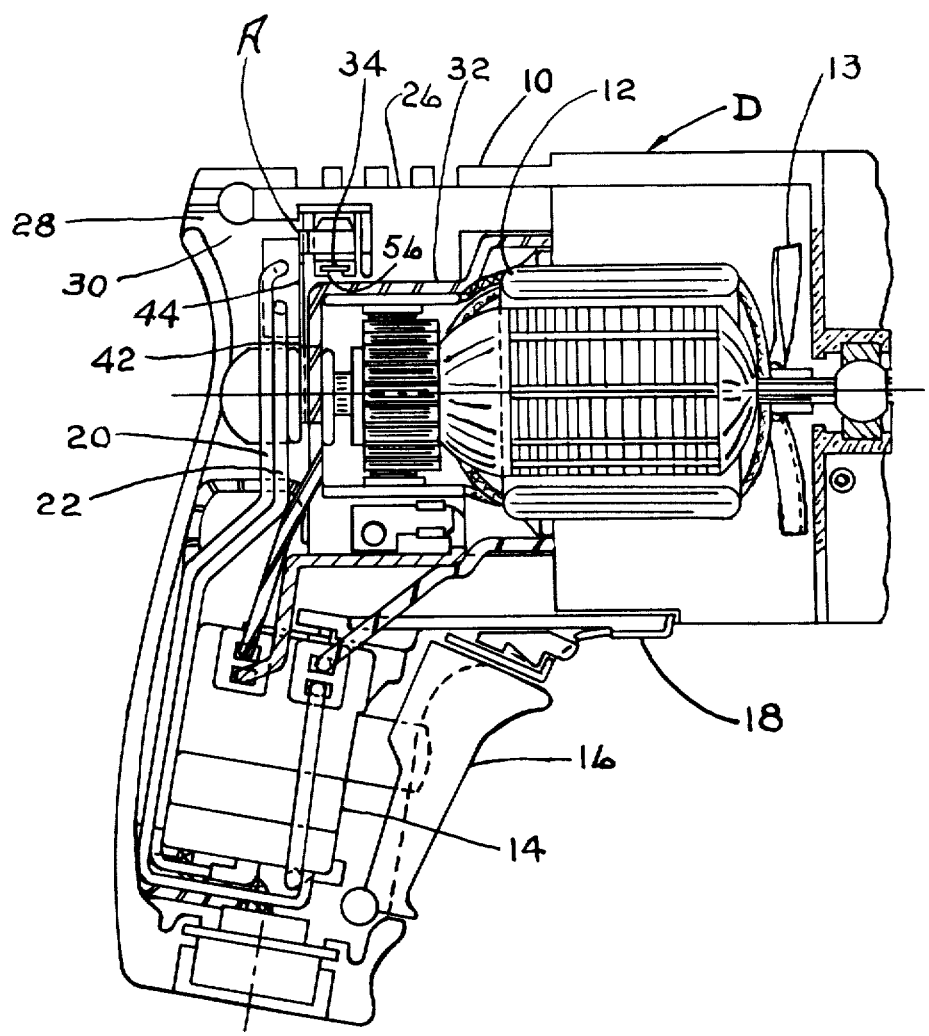
FIG. 1 is a portional front elevational sectional view of a hand drill incorporating the invention.

In the drawings, like numbers and/or letters refer to like parts.

Referring first to FIG. 1, there is shown the rear or hand-grasping portion of an electrical drill D having a drill housing 10 which contains the usual air-cooled, drill motor 12, the motor fan 13, and the trigger control switch 14 having a finger-operated trigger 16 and a reversing switch 18. An SCR, triac (or like thyristor) heat sink assembly, generally referred to as A, is electrically connected to the switch 14 by the electrical conducting wires 20 and 22.

The drill D and its basic components are shown and described in U.S. patents of applicant's assignee. For example, the drill with a fan-cooled motor is shown in U.S. Pat. No. 3,671,699, issued June 20, 1972. The trigger switch and electrical control system including an SCR, triac or like thyristor unit is shown in aforementioned U.S. Pat. No. 3,536,973. The reversing switch is shown in U.S. Pat. No. 3,603,757, issued Sept. 7, 1971. Such basic components will not be described further in detail, as such components, per se, form no part of the present invention.

As aforementioned, the motor 12 is provided with a fan 13 which creates an airstream flowing rearwardly in the drill D past the motor 12 to cool the same, such airstream exiting from the drill through the top vents 26 and the rear vents 28. The drill housing 10 has a chamber or cavity 30 disposed in the path of the airstream.

The housing wall 32 has a housing tab 34 adapted to receive the thyristor-heat sink assembly A in a manner to be hereinafter described, such structure placing the assembly A directly in the exiting airstream.

Referring now to FIGS. 2, 3 and 7, the thyristor-heat sink assembly A includes an SCR or triac (or like thyristor) unit 40 which, in the preferred form of the invention, is formed integral with its coacting heat sink 42 for effective heat dispersement to the heat sink. The heat sink 42 includes an elongated base 44 having a plurality of laterally extending heat dispersing vanes 46. In the preferred form of the invention, the vanes 46 are formed progressively larger (from right to left as best shown in FIG. 7) for added heat dispersement. Each of the vanes 46 may have a wing 48 extending laterally therefrom, preferably at a right angle, as shown, for still further added heat dispersement.

The heat sink base 44 has a laterally extending bracket 52 on which is secured a semi-resilient assembly sheath clip 56, which is adapted to snap onto the housing tab 34 as shown in FIG. 1, thereby securing the thyristor-heat sink assembly A in the drill housing cavity 30. Such snap-in feature is, in effect, a bayonet fitting or detachable wire connector and is effected by the spaced coacting resilient wings 60, 62 (FIG. 3) on the clip 56, which are adapted to resiliently flex partially toward and away from each other to grasp the housing tab 34 in a bayonet-fitting manner. Thus, if there should be a failure of the thyristor unit 40, the thyristor-heat sink assembly A may be easily removed from the drill D and replaced with a new assembly.

In like manner, the assembly wires 20 and 22 may be esily removed from the switch 14. For example, the wire 22 has a semi-resilient wire sheath clip 66 (FIG. 7) constructed similar to that of the assembly clip 56, such wire clip 66 being adapted to snap-on the switch terminal tab 68 as best shown in FIGS. 4, 5 and 6, in a bayonet-fitting manner.

Thus the invention provides a portable electric motor-driven tool including a tool housing 10, an electric motor 12 operatively disposed in the housing, an electrical control system or assembly A disposed in the housing for controlling the speed of the motor including the electric switch 14 for controlling the flow of electrical current to the motor and including a silicon controlled rectifier unit or triac (or like thyristor) 40 and heat sink 42 assembly A, electrical current conducting wires 20 and 22 connecting the switch 14 with the assembly A, such motor 12 having a fan 13 providing an airstream for cooling the motor. The housing 10 has a cavity 30 disposed in the airstream and is configured to receive the thyristor and heat sink assembly A therein. Assembly detachable securement means 34, 56 is disposed in the cavity 30 for detachably securing the thyristor and heat sink assembly A within the cavity 30 and in the airstream to cool the assembly. Wire detachable securement means 66, 68 for detachably securing said wires to the switch is also provided.

The heat sink 42 is formed integral with the silicon controlled rectifier unit or triac (or like thyristor) 40 to form a unitary composite assembly or structure A. The assembly detachable securement means is a bayonet fitting including the housing 10 having a housing tab 34 disposed on a wall 32 of the cavity 30 and the assembly A having a coacting resilient assembly sheath clip 56 disposed on the heat sink 42 and slidable onto the housing tab 34 in detachable relation therewith. The wire detachable securement means is a bayonet fitting including the switch 14 having at least one switch tab 68 forming an electrical terminal for the switch and at least one of the wires 20, 22 leading from the assembly A having a coacting resilient wire sheath clip 66 on its free end slidable onto the switch tab 68 in detachable relation to form an electrical connection therewith.

With the present invention, the SCR or triac (or like thyristor) 40 is constantly air-cooled thereby lowering its operating temperature and substantially diminishing the failure rate thereof. If failure should occur, replacement of the thyristor-heat sink assembly A is easily effected with the detachable bayonet fittings 34, 56 on the assembly A and the detachable bayonet fittings 66, 68 on the assembly wires 20, 22 as aforedescribed.

When a triac is employed, its current carrying capacity is substantially increased as the constant air-cooling feature lowers its operating temperature to a tolerable level, whereby the triac may be retained in the control circuit at all times (even when the motor is operating at full speed), thus eliminating the need for a bypass switch of the type as shown in the control circuit of U.S. Pat. No. 3,536,973, as aforedescribed.

The terms and expressions which have been employed are used as terms of description, and not of limitation, and there is no intention, in the use of such terms and expressions, of excluding any equivalents of the features shown and described or portions thereof, but it is recognized that various modifications are possible within the scope of the invention claimed.

What is claimed is:

1. A portable electric motor-driven tool comprising, a tool housing, an electrical motor operatively disposed in said housing, a coacting electrical control system connected to said motor and operatively disposed in the housing for controlling the speed of said motor, said electrical control system including a coacting electrical switch disposed on the housing and operatively connected to said motor for manually turning on and off the flow of electrical current to the motor to start and stop the same, said electrical control system also including a coacting thyristor and heat sink assembly, coacting electrical current conducting wires connecting said switch with said assembly, a coacting fan operatively secured to the motor providing an air stream for cooling the motor, said housing having a housing wall having a coacting cavity disposed in the air stream and configured to receive said thyristor and heat sink assembly therein, coacting assembly detachable securement means disposed in said cavity for detachably securing said thyristor and heat sink assembly within the cavity and in the air stream to cool the assembly, and coacting wire detachable securement means for detachably securing said wires to the switch, said heat sink being formed integral with the thyristor to form a unitary composite structure, said assembly detachable securement means being a detachable wire connector including said housing having a housing tab disposed on a wall of said cavity and said assembly having a coacting resilient assembly sheath clip disposed on said heat sink and slidable onto said housing tab in detachable relation therewith, said wire detachable securement means being a detachable wire connector including said switch having at least one switch tab forming an electrical terminal for the switch and at least one of said wires leading from the assembly having a coacting resilient wire sheath clip on its free end slidable onto said switch tab in detachable relation to form an electrical connection therewith, said heat sink comprising an elongated base having a plurality of laterally extending heat dispersing vanes extending therefrom, each of said vanes having a wing extending at a right angle therefrom for added heat dispersement, said vanes being formed of progressively larger size from one end of said base to the other end thereof.

* * * * *